United States Patent [19]
Sbalchiero et al.

[11] Patent Number: 5,486,672
[45] Date of Patent: Jan. 23, 1996

[54] METHODS AND APPARATUS FOR COMMUTATOR FUSING

[75] Inventors: Federico Sbalchiero; Alessandro Rossi, both of Florence, Italy

[73] Assignee: Axis USA, Inc., Marlborough, Mass.

[21] Appl. No.: 166,095

[22] Filed: Dec. 13, 1993

[51] Int. Cl.[6] .................................................. B23K 11/11
[52] U.S. Cl. ...................... 219/86.41; 219/86.7; 219/109; 219/117.1
[58] Field of Search .............................. 219/78.01, 86.41, 219/86.51, 86.61, 86.7, 109, 110, 117.1

[56] References Cited

U.S. PATENT DOCUMENTS 3,368,054  2/1968  Brunner .......................... 219/78.01
3,781,981  1/1974  Miura et al. ..................... 219/78.01
5,063,279  11/1991 Rossi ............................... 219/86.51
5,122,975  6/1992  Luciani et al. ...................... 364/550

Primary Examiner—Clifford C. Shaw
Attorney, Agent, or Firm—Fish & Neave; Robert R. Jackson; G. Victor Treyz

[57] ABSTRACT

An improved fusing machine is provided that allows commutators to be balanced during the fusing process. Commutator tangs are compressed onto coil leads to form lead connections. The fusing machine compresses the tangs to varying degrees relative to the shaft. The commutator can be balanced during fusing by compressing tangs to a common radial position or by compressing diametrically opposed tangs to the same extent.

31 Claims, 6 Drawing Sheets

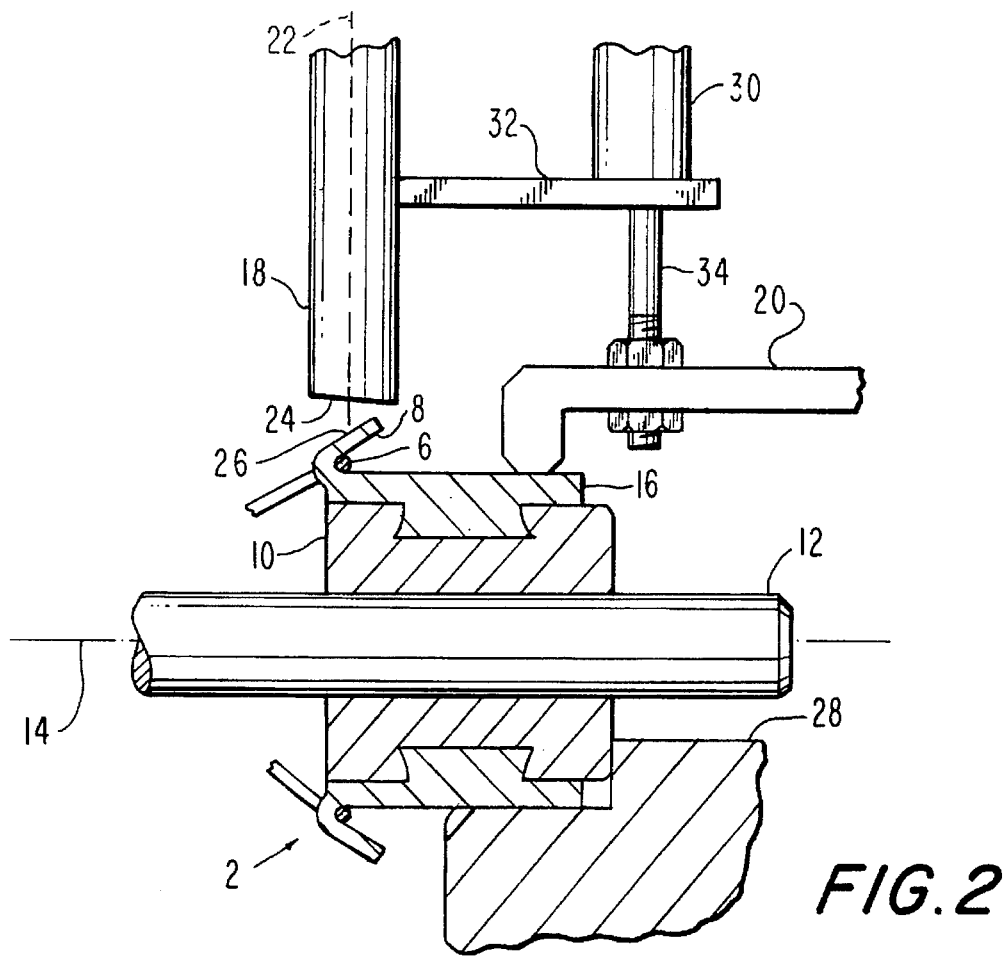
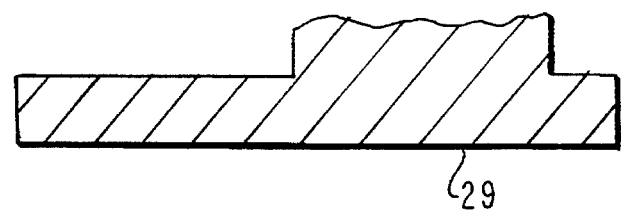
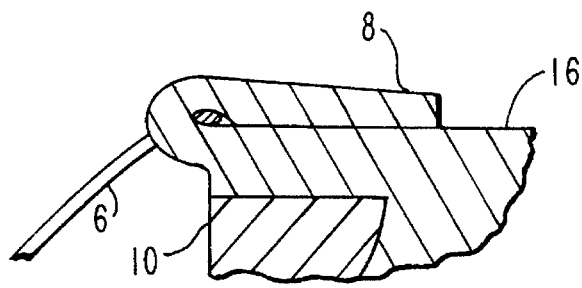
FIG. 2
FIG. 3

METHODS AND APPARATUS FOR COMMUTATOR FUSING

BACKGROUND OF THE INVENTION

This invention relates to methods and apparatus for fusing coil leads to electric motor armature commutators. More particularly, the invention relates to methods and apparatus for ensuring that commutators are well balanced after coil leads are formed.

Machines for fusing coil leads to the commutators of electric motor armatures are well-known. Fusing machines are used to attach the leads to the commutators after the coils have been wound onto the armatures. Good electrical contacts and strong mechanical bonds between the leads and the commutators are formed by using a combination of heat and pressure. For example, commonly-assigned U.S. Pat. No. 5,063,279, which is hereby incorporated by reference herein, and commonly-assigned U.S. Pat. No. 5,300,753 which is hereby incorporated by reference herein, describe fusing machines which have electrodes that are used to compress deformable tangs onto leads while simultaneously supplying an electric current. As the current passes through a tang, the adjacent area is heated, which vaporizes a portion of the electrical insulation on the lead. By vaporizing the insulation, a clean electrical contact is formed between the lead and the commutator. Each tang is also compressed firmly enough to form a strong mechanical bond.

Electric motor armatures typically contain imperfections, such as slight variations in the diameter of the commutator, which can adversely affect armature balance. Unbalanced armatures cause motor vibration and excessive motor wear. Typically, the primary concern when forming fused connections has been to avoid either compressing a tang insufficiently, which can lead to a weak connection, or compressing a tang too much, which can sever the lead. As a result, fusing machines generally monitor the relative displacement between the electrode used to form the lead connection and the commutator bar that contains the tang, so that tangs are compressed to an equal degree.

However, if there are substantial variations in the radial positions of the commutator bars due to imperfections in the armature, the conventional approach, in which all tangs are compressed equally during fusing, leaves the commutator, and therefore the armature, unbalanced. It would therefore be desirable to balance the armature commutator by compressing some tangs to a greater extent than others during the fusing operation.

SUMMARY OF THE INVENTION

It is thus an object of the present invention to provide methods and apparatus for forming fused lead connections, whereby the tangs on a commutator are compressed to varying degrees with respect to the shaft of the commutator in order to balance the commutator.

It is also an object of the invention to avoid incomplete or weak lead connections by ensuring that the degree to which the tangs are compressed remains within an acceptable range.

These and other objects of the invention are accomplished in accordance with the principles of the invention by providing an improved fusing machine and method of operation. Commutators can be balanced during fusing by compressing tangs to varying degrees relative to the axis of rotation of the armature, so that the center of mass of the commutator becomes aligned with the axis of rotation. For example, commutators can be balanced by compressing tangs to a common radial position with respect to the shaft of the commutator. The common radial position can be empirically determined for each type of commutator, or can be determined by the fusing machine during operation. When the fusing machine is used to determine the common radial position, the fusing machine initially compresses a tang by applying a predetermined heat (typically generated by applying a current) and a predetermined force for a preselected time. A displacement sensor is then used to determine the position at which the electrode came to rest with respect to the shaft of the commutator. The remaining tangs are compressed into the same relative position with respect to the shaft, which improves the balance of the commutator. The fusing machine can also measure the radial position of each of the commutator bars on a commutator prior to fusing to determine the degree to which each tang must be compressed. If desired, commutators can be balanced by compressing diametrically opposed tangs to the same extent.

To ensure satisfactory lead connections, each of the tangs is preferably compressed enough to ensure that a solid contact is formed, even if it would be desirable to compress some of the tangs less to balance the commutator more completely. To avoid weakening the wire, the tangs are not compressed excessively, even if doing so would further balance the commutator.

Further features of the invention, its nature and various advantages will be more apparent from the accompanying drawings and the following detailed description of the preferred embodiments.

BRIEF DESCRIPTION OF THE DRAWINGS

FIG. 2 is an elevational view of a typical fusing machine.

FIG. 3 is a cross-sectional view of a portion of a commutator showing a fused lead connection.

DETAILED DESCRIPTION OF THE PREFERRED EMBODIMENTS

Figure 1:
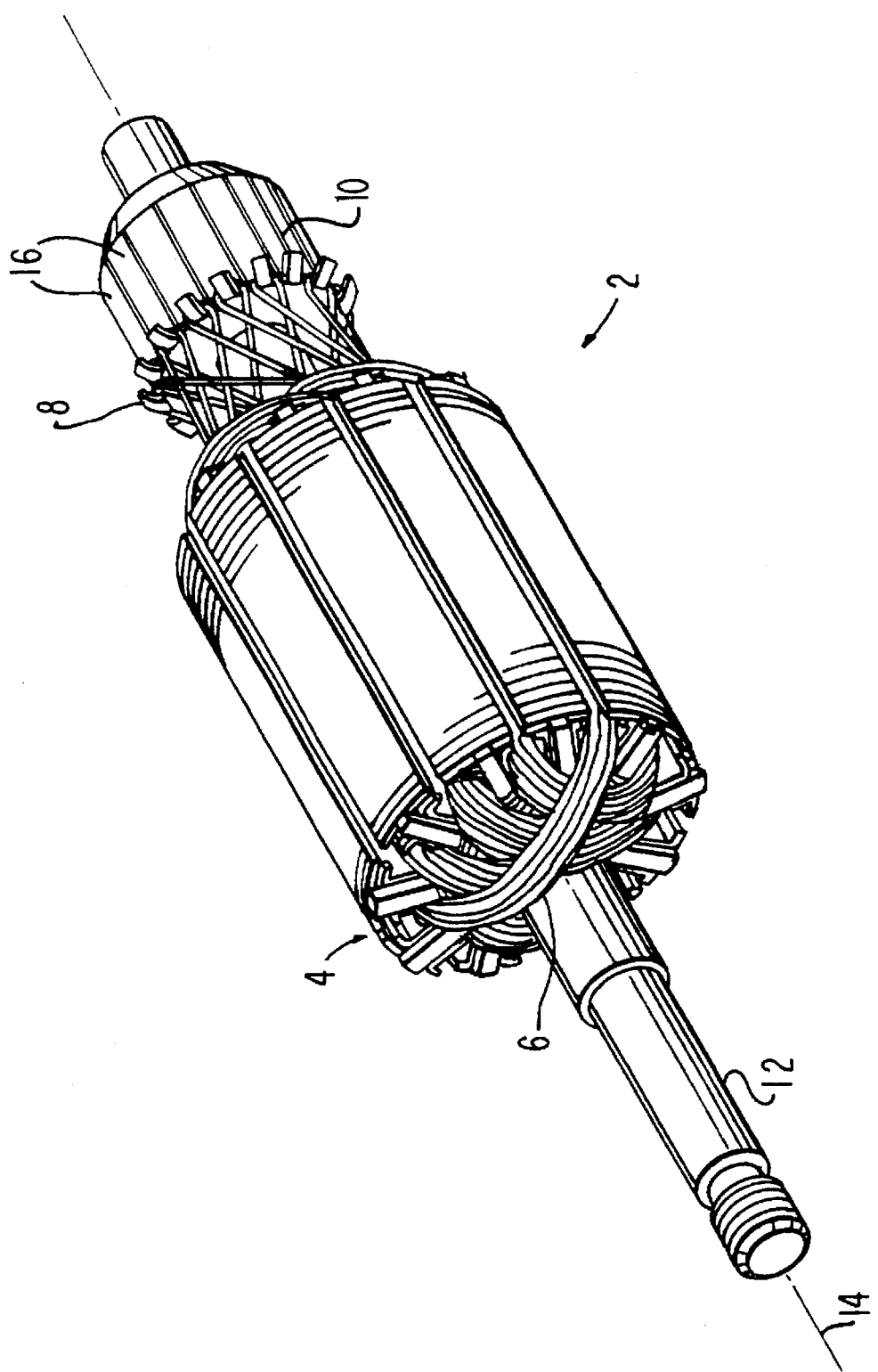
FIG. 1 is a perspective view of an electric motor armature showing the location of the commutator. The tangs on the commutator are shown prior to fusing.

An electric motor armature 2 is shown in FIG. 1. Armature 2 has a number of armature slots 4, into which wire 6 is wound. At appropriate stages during the winding process, wire 6 is wound around tangs 8 of commutator 10. En operation, shaft 12 is supported by a bearing structure (not shown) that allows armature 2 to rotate about axis 14. Commutator 10 has electrically conducting bars 16, from which tangs 8 project. In completed electric motors, brushes contact bars 16.

During the process of manufacturing armatures, a stable electrical and mechanical connection must be formed between wire 6 and tangs 8. In order to create a durable connection between wire 6 and tangs 8, a fusing machine is used to heat the tangs 8 and to compress them on top of the wire 6. Shaft 12 of armature 2 is engaged by the fusing machine, which rotates the armature 2 to place the tang to be fused in the correct position for fusing.

As shown in FIG. 2, a typical fusing machine has a primary electrode 18 and a ground electrode 20, each of which can be moved independently along axis 22. To form a connection between wire 6 and tang 8, ground electrode 20 is placed into contact with commutator bar 16 and primary electrode 18 is lowered toward a tang 8 along axis 22. When primary electrode 18 has advanced sufficiently, most of the lower surface 24 of primary electrode 18 and the upper surface 26 of tang 8 will be in contact. At this point, while continuing to compress tang 8, current is applied to tang 8 via primary electrode 18 and ground electrode 20, producing a rapid temperature rise due to ohmic heating. As a result, the wire 6 in contact with tang 8 is heated, which vaporizes the insulation on wire 6 in the vicinity of tang 8. Because the insulation is vaporized, a good electrical contact can be formed between wire 6 and tang 8.

A typical fusing process involves compressing tangs 8 by advancing primary electrode 18 a predetermined distance along axis 22, while supporting commutator 10 with shelf 28, shown in FIG. 2. Primary electrode 18 is advanced a fixed distance along axis 22, after being aligned with tang 8, regardless of the initial position of bar 16 along axis 22. The distance that primary electrode 18 is advanced is monitored by a displacement sensor (not shown) that is coupled to primary electrode 18. Because variations in the diameter of commutator 10 are not taken into account in determining how far to advance primary electrode 18, the tangs 8 on portions of commutator 10 where the diameter of commutator 10 is the largest are compressed more than the tangs 8 that lie on commutator 10 where the diameter is the smallest. If the diameter of commutator 10 varies significantly, some tangs 8 may be compressed excessively, causing wire 6 to be weakened, whereas other tangs 8 may not be compressed sufficiently, leading to inadequate commutator connections. Further, this fusing approach does nothing to balance the commutator.

Another common fusing approach involves monitoring the relative displacement of primary electrode 18 and ground electrode 20 using displacement sensor 30, so that each tang can be compressed equally. Displacement sensor 30 is coupled to a structure (not shown) that houses primary electrode 18. The connection between displacement sensor 30 and primary electrode 18 is depicted schematically by bracket 32. Shaft 34 is connected to ground electrode 20 and reciprocates within displacement sensor 30. The output of the displacement sensor 30 is linearly proportional to the relative position of the shaft 34 within the displacement sensor 30. The output of the displacement sensor 30 shown in FIG. 2 is therefore proportional to the relative displacement between primary electrode 18 and ground electrode 20.

By determining the relative displacement of the electrodes, it is possible to accurately position the primary electrode 18 with respect to the top surface of bar 16, so that each tang 8 can be compressed properly. During fusing, after the position of bar 16 has been determined by lowering ground electrode 20 into contact with the bar, primary electrode 18 can be driven a predetermined distance along axis 22, thereby compressing tang 8 by a predetermined amount and making the desired connection between wire 6 and bar 16. This approach is used to compress each tang the same amount, which ensures that tangs 8 are compressed sufficiently to form stable bonds, while also ensuring that tangs 8 are not compressed excessively, which would weaken or sever wire 6. However, a drawback encountered with this approach is that if each tang 8 is compressed an identical amount, any variations in the radial positions of the bars 16 with respect to axis 14 remain uncompensated, so that unbalanced commutators 10 remain unbalanced after fusing. Further, with this approach, even if the bars 16 were initially at radially equal positions with respect to the axis 14, the bars 16 may move slightly during fusing. Because it is not possible to control the position of the tangs 8 or bars 16 with respect to axis 14, the tangs 8 and bars 16 will typically no longer be equally positioned with respect to axis 14 after fusing, which causes the commutator to be unbalanced.

Figure 4:
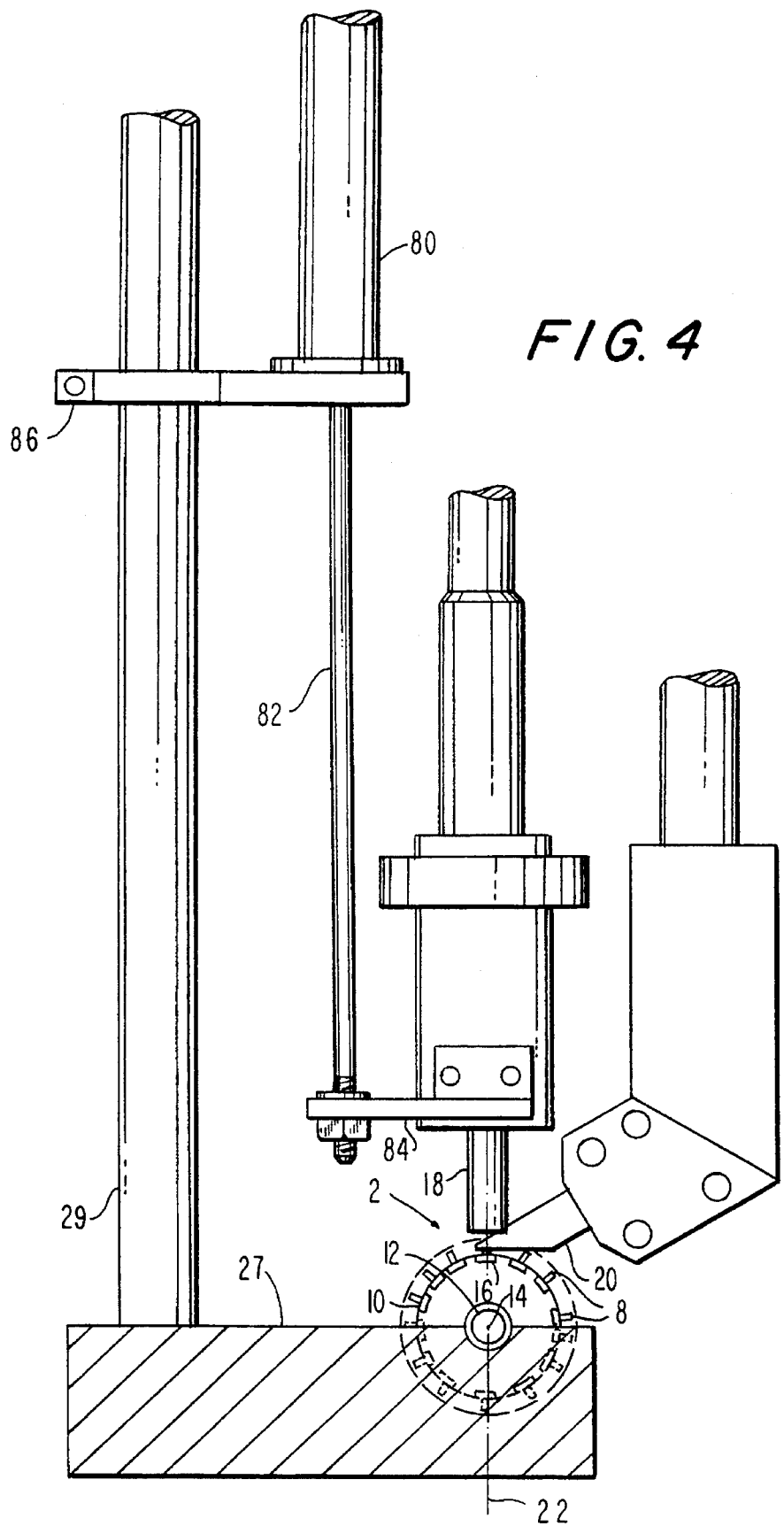
FIG. 4 is an elevational view, partly in section, of an illustrative fusing machine in accordance with the present invention.

A fusing machine constructed in accordance with the present invention is shown in FIG. 4. During fusing, the position to which the tangs 8 of bars 16 are compressed is controlled with respect to the shaft 12. For example, each tang 8 can be compressed to the same radial position with respect to shaft 12, regardless of variations in the diameter of the commutator 10. By centering the tangs 8 in this way, it is possible to balance commutator 10, which in turn improves the balance of armature 2. If desired, the radial position to which the tangs 8 are compressed can be empirically determined for different types of commutators 10 prior to fusing.

The fusing machine can be used to determine the desired radial position to which the tangs 8 are to be compressed. When forming the initial lead connection, the primary electrode 18 compresses tang 8 with a predetermined force and heat. After the lead connection is formed, the degree to which the tang 8 was deformed is measured with displacement sensor 80. The position of shaft 82, which reciprocates within the displacement sensor 80, determines the displacement sensor output. Shaft 82 is connected to the primary electrode 18 by bracket 84. The displacement sensor 80 is mounted to fusing machine frame 29 with bracket 86. During fusing, base member 27, which is connected to fusing machine frame 29, supports shaft 12. The output of displacement sensor 80 is proportional to the distance between the primary electrode 18 and the shaft 12, which allow the position of the deformed tang 8 to be measured.

Once it is known to what extent the first tang 8 was deformed under the preselected force and heat conditions, the remaining lead connections are made. Heat is preferably generated by applying a current to bars 16, although other methods of supplying heat to the bar can also be used. During this process, the time for which force and heat are applied is adjusted, so that each tang 8 is compressed to the same radial extent with respect to the shaft 12. If desired, the force and heat applied to the tang 8 can also be varied. By compressing each tang 8 to a common radial position the center of mass of the commutator 10 is brought into better alignment with the axis 14, which balances the commutator 10. Because the center of mass of the commutator 10 coincides with the longitudinal axis 14 of the armature 2, armature vibration and the motor wear that results from such vibration is reduced.

Another approach for compressing tangs 8 of bars 16 to radial positions with respect to the shaft that balance the commutator involves compressing a first half of the tangs 8 on a commutator according to predetermined fusing programs and subsequently compressing the diametrically opposed tangs to the same extent. After using, the tangs 8 in each pair of diametrically opposed tangs 8 have the same radial position with respect to shaft 12, which tends to balance commutator 10.

Figure 5:
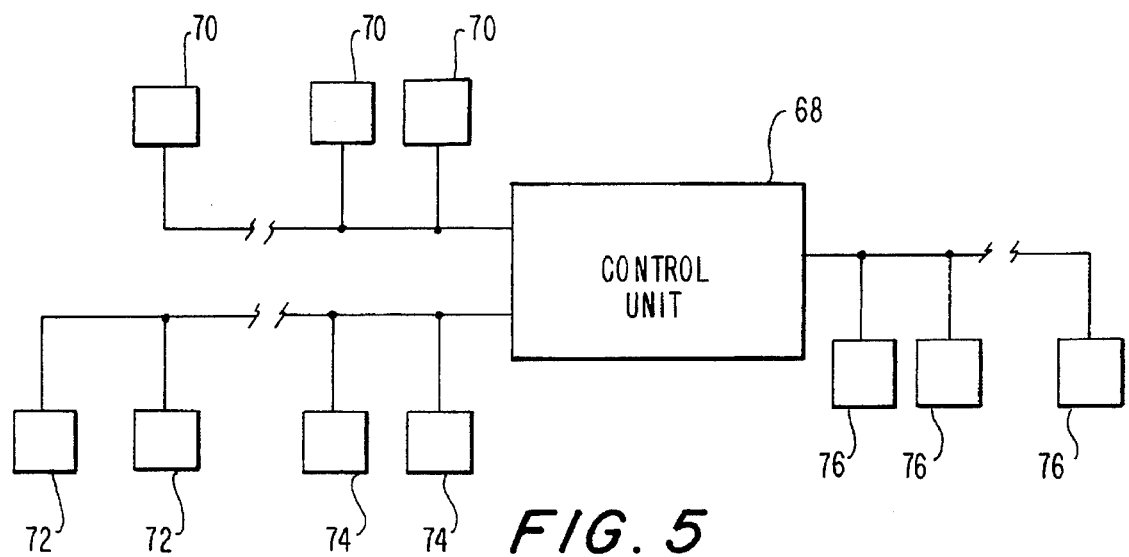
FIG. 5 is a schematic diagram showing sensors, a control unit, and several drive units, in accordance with the present invention.

As shown in FIG. 5, position signals from fusing machine sensors are preferably processed using a control unit 68 which is typically based on a microprocessor or microcontroller. Fusing machines generally contain such control units for executing control programs that direct the operation of the machine during fusing. Displacement sensors 70 can be used to monitor the position of the fusing machine components, such as primary electrode 18, which allows the position to which each tang 8 is compressed to be monitored. If half of the tangs 8 on a commutator 10 are to be compressed to match the position to which diametrically opposed tangs 8 on the other half of the commutator were compressed, the control unit 68 retains the measured positions of the first tangs 8 that were compressed so that the diametrically opposed tangs 8 can be compressed correctly.

One or more force or pressure monitoring sensors 72 can be used to determine the pressure experienced by various components during operation. The velocities of the fusing machine components can be determined by processing position measurements made by displacement sensors 74. By using sensors to measure operational characteristics, such as displacement, pressure, and velocity, the control unit 68 can generate the control signals that are necessary for directing the motion of the fusing machine components. The control signals are provided to drive units 76, each of which drives a corresponding component of the fusing machine, such as primary electrode 18 or ground electrode 20 (FIG. 4). The drive unit 76 for primary electrode 18 is preferably an air cylinder.

Figure 6:
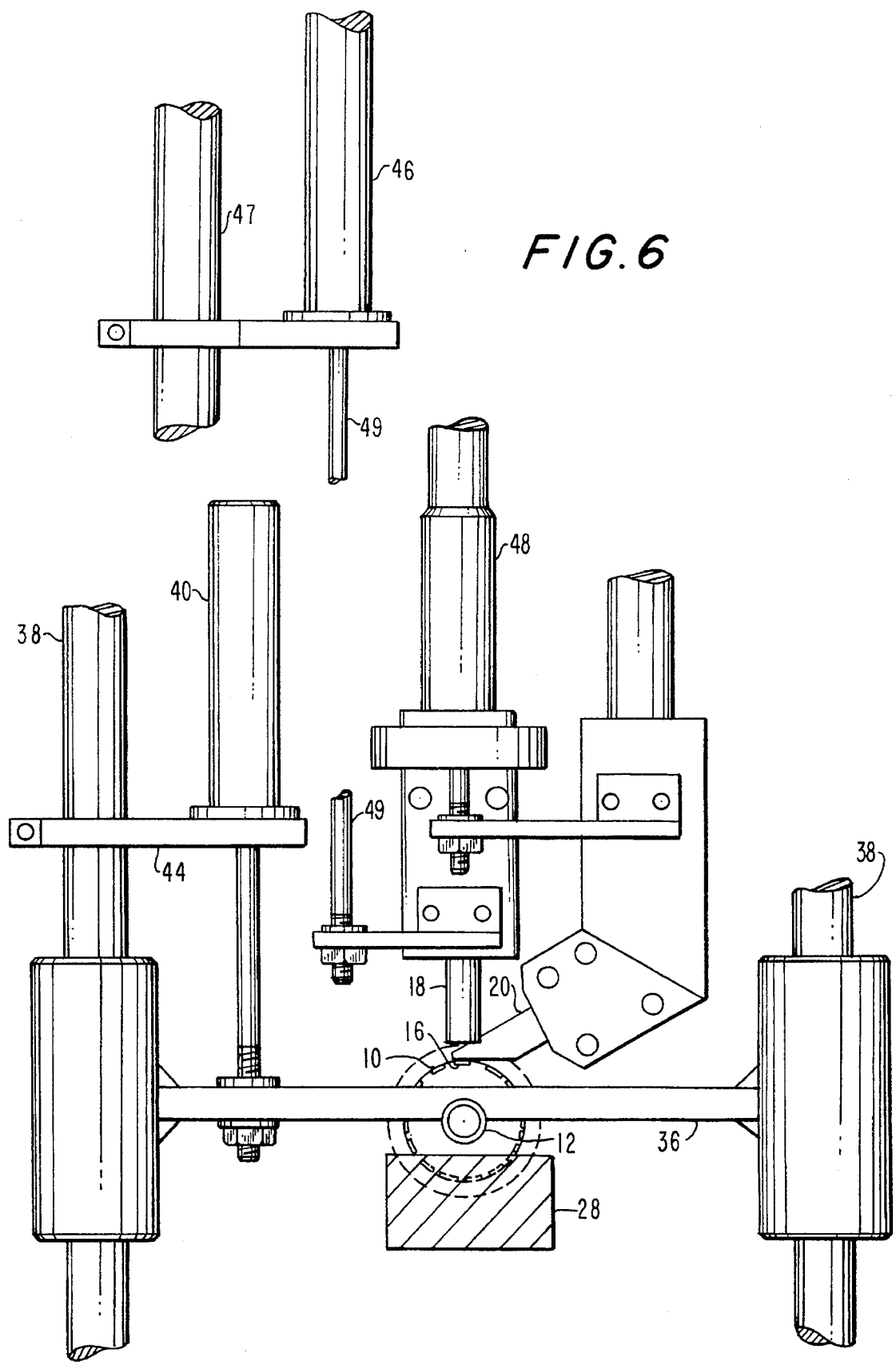
FIG. 6 is an elevational view, partly in section, of a further illustrative embodiment of a fusing machine in accordance with the invention.

Further apparatus for balancing commutator 10 by deforming tangs 8 to varying degrees is shown in FIG. 6. The fusing machine shown in FIG. 6 uses several displacement sensors to determine the position of the bars 16 relative to the shaft 12 and to control the position of primary electrode 18 with respect to the shaft 12 and the bars 16 during fusing. The fusing machine has a bridge 36, which can be placed in contact with shaft 12. Bridge 36 reciprocates on vertical supports 38. The bridge 36 is used to measure the position of shaft 12 relative to supports 38 using a displacement sensor 40. The position of the shaft within displacement sensor 40 determines the displacement sensor output. The displacement sensor 40 is connected to one of the supports 38 by bracket 44. Because the supports 38 are connected to the fusing machine frame 29 (FIG. 4), the position of the bridge 36 can be determined with respect to an "absolute" reference.

The positions of primary electrode 18 and ground electrode 20 can also be determined with respect to the frame 29 of the fusing machine. For example, the position of the primary electrode 18 in relation to frame 29 can be measured by connecting displacement sensor 46 between primary electrode 18 and frame 29. The cylindrical housing of the displacement sensor 46 is connected to support 47, which is connected to the fusing machine frame. Shaft 49, which reciprocates within the housing, is connected to the primary electrode 18. The relative displacement between the primary and ground electrodes is measured using displacement sensor 48. The absolute position of ground electrode 20 can be calculated from the known values of the absolute position of the primary electrode 18 and the relative displacement between the primary and ground electrodes.

If the absolute displacements are not known, the commutator 10 can be balanced during fusing if the relative displacements between the primary electrode 18, ground electrode 20, and shaft 12 (bridge 36) are known. By determining the actual radial distance between the surface of each of the bars 16 from which tangs 8 project and the shaft 12, the tangs 8 of the bars 16 that have surfaces that are radially the farthest from shaft 12 can be compressed to a greater extent during fusing and the tangs 8 of the bars 16 that have surfaces that are radially closest to shaft 12 can be compressed less, thereby balancing the commutator 10.

Figure 7:
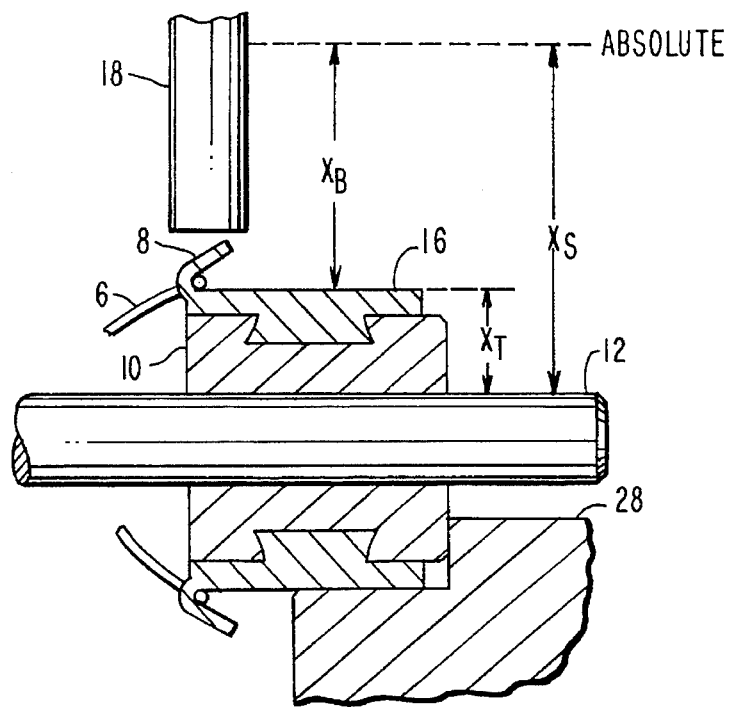
FIG. 7 is an elevational view, partly in section, of the fusing machine of FIG. 6.

As shown in FIG. 7, $X_B$ is the distance between the top of bar 16 and a fixed fusing machine reference point and $X_s$ is the distance between shaft 12 and the fixed reference point. If these displacements are known, then the displacement $X_T$, which is the height of bar 16 relative to shaft 12, can be calculated and compared to the nominal bar height. If the measured value of $X_T$ for a particular bar exceeds the desired bar height, then the tang 8 corresponding to that bar 16 can be compressed more than usual. If the measured height of a bar 16 falls short of the expected bar height, then the tang 8 corresponding to that bar can be compressed less than it would usually be compressed. Compressing tangs 8 in this way balances the commutator 10 by shifting the center of mass of commutator 10 closer to the longitudinal axis of armature 2.

Although it is possible to vary the degree to which various tangs 8 are compressed, the range of allowable tang compression is typically limited. Each of the tangs must be compressed sufficiently to ensure that a solid contact is formed. To ensure that wire 6 is not unnecessarily weakened, however, the tangs 8 should not be compressed excessively. The minimum and maximum extent to which the tangs 8 of a commutator 10 can be reliably compressed depends on the design of each particular commutator. If commutator 10 is manufactured fairly precisely, compressing all tangs 8 to the same radial position with respect to shaft 12 will result in a balanced commutator and good lead connections. If however, there are significant variations in the radial positions of the bars 16 of a commutator 10, the degree to which tangs 8 are compressed must be maintained within a limited range. The primary electrode can be advanced sufficiently to compress tangs to the minimum level of compression, even if it would be desirable to compress some of the tangs less to balance the commutator more completely. Similarly, tangs 8 are not compressed beyond the maximum compression level, even if doing so would help balance the commutator 10.

In the illustrative embodiment of the fusing machine shown in FIG. 6, the necessary displacement measurements are made using absolute displacement sensors connected to the primary electrode and the bridge and a differential sensor connected between the primary and ground electrodes. Various other multiple sensor arrangements are also possible. Preferably, two distances are known. First, the distance between the top of each bar 16 and the shaft 12 should be known, so that this distance can be compared with the nominal bar height to determine the degree to which tang 8 should be compressed. Second, the distance between primary electrode 18 and bar 16 must be known so that the primary electrode can be accurately advanced the desired amount. The determination of these two distances involves determining the relative position of three fusing machine components: primary electrode 18, ground electrode 20, and bridge 36. In one embodiment, the position of each of the three components can be measured using corresponding absolute displacement sensors. In embodiments similar to the one illustrated in FIG. 6, two absolute displacement sensors and one relative displacement sensor can be used. In another arrangement, two relative displacement sensors can be used, each being connected between two of the three fusing machine components of interest. Although it is not necessary, if it is desired to monitor the absolute position of the fusing machine elements, the two relative displacement sensors may be supplemented by connecting an absolute displacement sensor to one of the elements.

Figure 8:
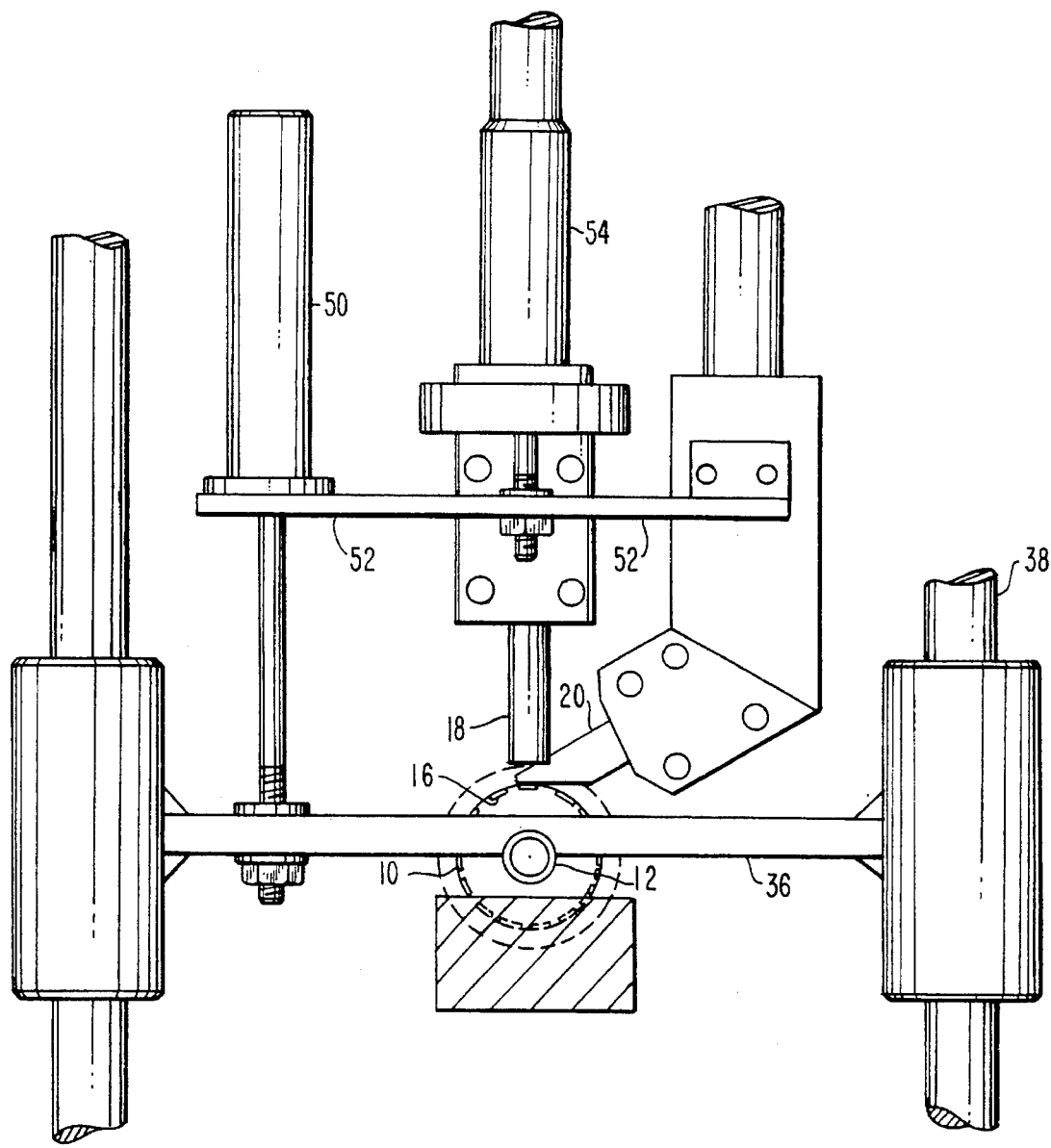
FIG. 8 is an elevational view, partly in section, of an additional illustrative embodiment of a fusing machine in accordance with the invention.

An illustrative embodiment of a fusing machine constructed using two relative displacement sensors is shown in FIG. 8. Displacement sensor 50 is connected between bridge 36 and ground electrode 20 by bracket 52, so that when ground electrode 20 is in contact with the top of one of bars 16 and bridge 36 is in contact with shaft 12, the height of bar 16 relative to shaft 12 may be determined. Displacement sensor 54 is connected between primary electrode 18 and ground electrode 20, so that when ground electrode 20 is in contact with one of the bars 16, the position of primary electrode 18 can be accurately controlled during fusing. As described above, various other sensor arrangements may be used. For example, as shown in FIG. 6, two relative displacement sensors can be commonly attached to bridge 36 or primary electrode 18, rather than commonly attached to ground electrode 20.

It will be understood that the foregoing is merely illustrative of the principles of this invention, and that various modifications can be made by those skilled in the art without departing from the scope and spirit of the invention.

We claim:

1. A machine for fusing electric motor armatures, each armature comprising a shaft and a commutator, the commutators having commutator bars with top surfaces to which coil leads are connected, the fusing machine comprising:

a primary electrode;

displacement sensor means for monitoring the displacement between said primary electrode and said shaft;

control means for controlling the displacement of said primary electrode relative to said shaft; and means for applying force and heat to portions of the commutator bars with the primary electrode to compress the portions of the commutator bars onto the coil leads to form fused lead connections, wherein said control mean directs said means for applying force and heat to compress diametrically opposed portions of the commutator bars with said primary electrode toward common radial positions with respect to the shaft to balance the commutator.

2. The machine defined in claim 1 further comprising means for directing the means for applying force and heat to apply force and heat with said primary electrode to each of the portions of the commutator bars so as to compress them to a single common radial position with respect to the shaft.

3. The machine defined in claim 2 further comprising:

means for directing the means for applying force and heat to apply a first predetermined force and heat to a first of the portions of the commutator bars, wherein said displacement sensor means determines to what radial position the first portion of the commutator bar is compressed in response to the first predetermined force and heat; and means for subsequently directing the means for applying force and heat to apply force and heat to each of the portions of the commutator bars so as to compress those portions to the same radial position to which the first portion was compressed.

4. The machine defined in claim 1, wherein the portions of the commutator bars are separable into a further comprising:

means for directing the means for applying force and heat to a predetermined forces and heats to first half of the portions of the commutator bars, wherein said displacement sensor means determines to what radial positions the means for applying force and heat compresses the first half of the portions of the commutator bars; and means for directing the means for applying force and heat to apply force and heat to each of the portions of the commutator bars in a second half of the commutator bars to compress those portions to the same radial positions to which diametrically opposed portions in the first half were compressed.

5. The machine defined in claim 4 further comprising means for placing the primary electrode against the first portion when, it is desired to determine the position of first portion with said displacement sensor means.

6. The machine defined in claim 1, further comprising:

a frame; and at least one displacement sensor for measuring the relative displacement between the primary electrode and the frame, the displacement sensor generating a signal that is representative of the relative displacement.

7. The machine defined in claim 6, wherein said control further comprises a control unit connected to the displacement sensor for receiving the signal that is representative of the relative displacement and generating a corresponding control signal that directs the means for applying force and heat to compress the portions of the commutator bars to the radial positions with respect to the shaft that balance the commutator.

8. The machine defined in claim 1, wherein the portions of he commutator bars that are compressed onto the coil leads are tangs.

9. A machine for fusing electric motor armatures, each armature comprising a shaft and a commutator, the commutators having commutator bars with top surfaces to which coil leads are connected the fusing machine comprising:

a primary electrode for compressing portions of the commutator bars onto the coil leads to form lead connections;

means for measuring the relative displacement between the shaft and the top surface of each commutator bar;

means for comparing the measured relative displacements between the shaft and each bar with a nominal bar height; and means for driving the primary electrode toward the shaft, such that the portions of those commutator bars that have relative displacements greater than the nominal bar height are compressed more than the portions of those commutator bars that have relative displacements less than the nominal bar height, so as to balance the commutator.

10. The machine defined in claim 9, wherein the means for measuring further comprises a ground electrode that may be placed against the top surface of one of the commutator bars when it is desired to determine the position of the top surface.

11. The machine defined in claim 9, wherein the means for measuring further comprises a bridge member that may be placed against the shaft when it is desired to determine the position of the shaft.

12. The machine defined in claim 9, wherein the means for measuring further comprises sensor means for measuring operational characteristics of fusing machine components selected from the group consisting of: the primary electrode, the ground electrode, and the bridge member.

13. The machine defined in claim 12, wherein the sensor means comprises at least one displacement sensor for measuring the relative displacement between the ground electrode and the bridge member, the displacement sensor generating a signal that is representative of the measured relative displacement.

14. The machine defined in claim 13, wherein the means for comparing the measured relative displacement with the nominal bar height comprises a control unit connected to the sensor means for receiving the signal that is representative of the measured relative displacement, comparing the signal to the nominal bar height, and generating a corresponding control signal that directs the means for driving to drive the primary electrode toward the shaft.

15. The machine defined in claim 9, wherein the portions of the commutator bars that are compressed onto the coil leads to form lead connections are tangs.

16. The machine defined in claim 9, wherein the means for driving the primary electrode toward the shaft comprises means for limiting the means for driving so that the means for driving (a) compresses the portions of those commutator bars that have relative displacements greater than the nominal bar height more than the portions of the commutator bars with relative displacements less than the nominal bar height, but less than a predetermined maximum extent, thus ensuring that the lead connections will not be weakened by excessively compressing the leads, and (b) compresses the portions of those commutator bars that have relative displacements less than the nominal bar height less than the portions of the commutator bars with relative displacements greater than the nominal bar height, but more than a predetermined minimum extent, thus ensuring that the lead connections will be sufficiently stable.

17. A method for fusing electric motor armature lead connections with a fusing machine having a primary electrode, the armatures each comprising a shaft and a commutator, the commutator having bars having portions to which coil leads are connected, the method comprising the step of:

measuring the displacement between said primary electrode and said shaft;

controlling the displacement of said primary electrode relative to said shaft;

applying force and heat to the portions of the commutator bars with the primary electrode to to form fused lead connections; and compressing diametrically opposed portions of the commutator bars toward common radial positions with respect to the shaft to balance the commutator.

18. The method defined in claim 17 further comprising the step of compressing the portion of each of the commutator bars to a single common radial position with respect to the shaft.

19. The method defined in claim 18, wherein the step of applying force and heat to the portions of the commutator bars comprises the steps of:

applying a predetermined force and heat to a first of the portions of the commutator bars;

determining to what radial position the first portion of the commutator bar is compressed relative to the shaft in response to the first predetermined force and heat; and compressing each of the portions of the commutator bars other than the first portion to the same radial position relative to the shaft to which the first portion was compressed.

20. The method defined in claim 17, wherein the portions of the commutator are separable into a first half of portions and a second half of portions, the method comprising the steps of:

compressing the first half of the portions of the commutator bars to first radial positions; and compressing each of the portions of the commutator bars in the second half to a radial position that is equal to that which a diametrically opposed portion in the first half was compressed.

21. The method defined in claim 17 further comprising the steps of:

measuring displacement of the primary electrode with a displacement sensor; and generating a signal with the sensor that is representative of the displacement.

22. The method defined in claim 21 further comprising the steps of:

receiving the signal that is representative of the displacement with a control unit;

generating a corresponding control signal; and applying force and heat in response to the control signal.

23. The machine defined in claim 17, wherein the portions of the commutator bars that are compressed onto the coil leads are tangs.

24. A method for fusing electric motor armature lead connections, the armatures each comprising a shaft and a commutator, the commutator having commutator bars with top surfaces to which coil leads are connected, the method comprising the steps of:

measuring the relative displacement between the shaft and the top surface of each commutator bar;

comparing the measured displacement for each commutator bar with a nominal bar height;

driving a primary electrode toward the shaft with a drive unit to form lead connections by compressing a portion of each of the commutator bars onto the coil leads;

compressing the portion of those commutator bars that have relative displacements greater than the nominal bar height more than the portions of the commutator bars that have relative displacements less than the nominal bar height; and compressing the portions of those commutator bars that have relative displacements less than the nominal bar height less than the portions of the commutator bars that have relative displacements more than the nominal bar height.

25. The method defined in claim 24, wherein the step of measuring the relative displacement further comprises the step of placing a ground electrode against the top surface of one of the commutator bars when it is desired to determine the position of the top surface.

26. The method defined in claim 24, wherein the step of measuring relative displacement further comprises the step of placing a bridge member against the shaft when it is desired to determine the position of the shaft.

27. The method defined in claim 24, wherein the step of measuring relative displacement further comprises the step of measuring operational characteristics of fusing machine components selected from the group consisting of: the primary electrode, the ground electrode, and the bridge member.

28. The method defined in claim 27, wherein the step of measuring operational characteristics further comprises the steps of:

measuring the displacement between the ground electrode and the bridge member using at least one displacement sensor; and generating a corresponding signal which is representative of the measured relative displacement.

29. The method defined in claim 28, wherein the step of comparing the measured displacements with a nominal bar height further comprises the steps of:

receiving the signal that is representative of the measured relative displacement with a control unit;

comparing the signal to the nominal bar height with the control unit; and generating a corresponding control signal with the control unit that directs the drive unit to drive the primary electrode toward the shaft.

30. The method defined in claim 24, wherein the step of driving the primary electrode toward the shaft to form lead connections comprises the step of forming lead connections by compressing tangs onto the coil leads with the primary electrode.

31. The method defined in claim 24, wherein the step of driving the primary electrode toward the shaft with the drive unit to compress the portion of each of the commutator bars onto the coil leads to form lead connections further comprises the steps of:

compressing the portions of those commutator bars that have relative displacements greater than the nominal bar height more than the portions of the commutator bars that have relative displacements less than the nominal bar height, but less than a predetermined maximum extent, thus ensuring that the lead connections will not be weakened by excessively compressing the leads; and compressing the portions of those commutator bars that have relative displacements less than the nominal bar height less than the portions of the commutator bars that have relative displacements more than the nominal bar height, but more than a predetermined minimum extent, thus ensuring that the lead connections will be sufficiently stable.

\* \* \* \* \*